Patented Apr. 6, 1954

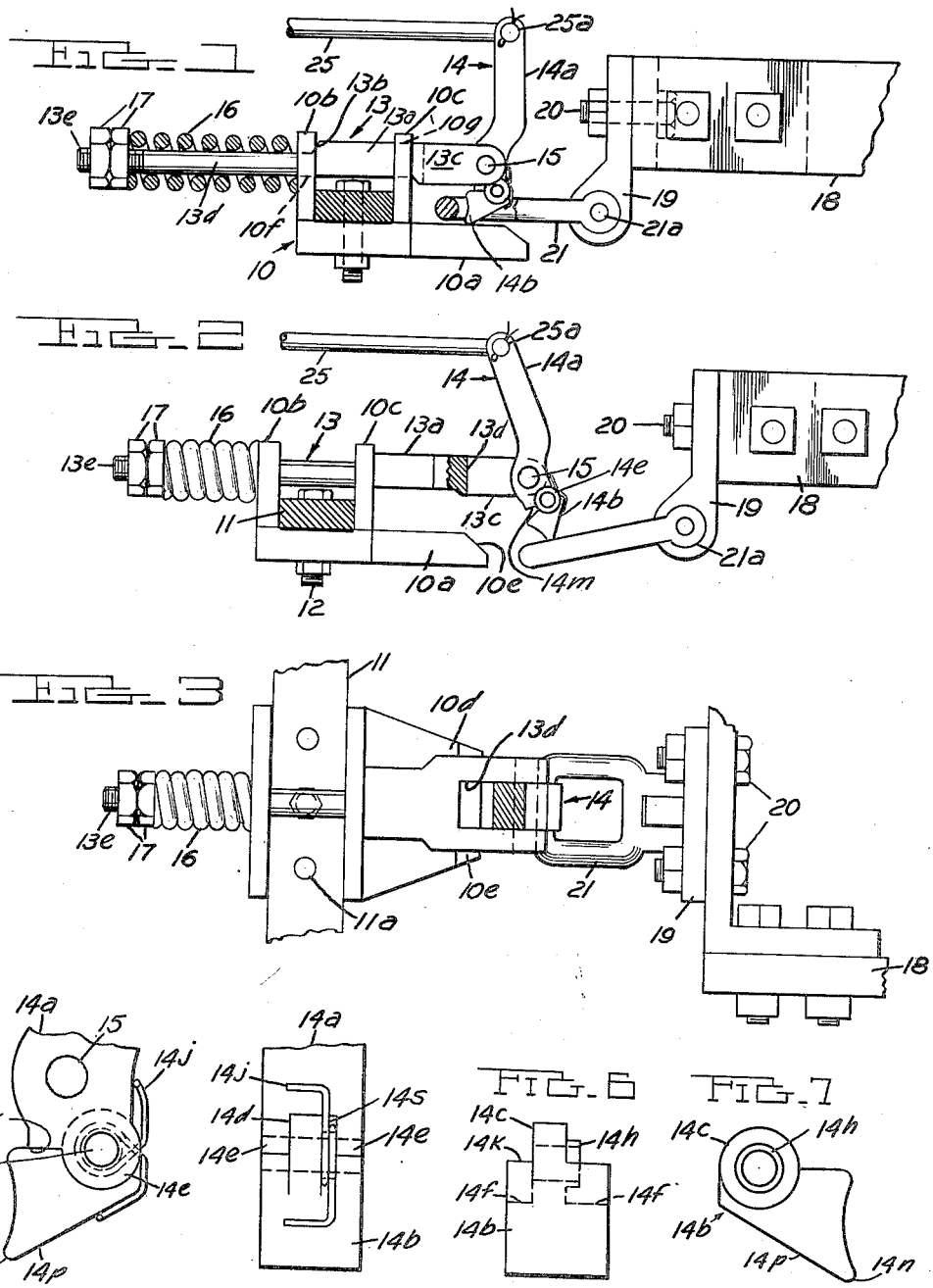

2,674,467

UNITED STATES PATENT OFFICE 2,674,467

IMPLEMENT RELEASE HITCH FOR TRACTORS

Rudolph J. Altgelt, South Bend, Ind., and Arnold C. Lindgren, Berkley, Mich., assignors, by mesne assignments, to Ford Motor Company, Dearborn, Mich., a corporation of Delaware Application August 23, 1951, Serial No. 243,256

6 Claims. (Cl. 280—453)

This invention relates to an overload release hitch for attaching trailed implements to tractors.

With modern high powered, high speed tractors towing trailed implements and particularly ground working implements, it is quite essential that provision be made for instant release of the implement in the event that the implement strikes a relatively immovable and unyielding object such as a stone or a stump when working in the ground. It is quite apparent that if the implement is not immediately released when the obstruction is encountered by the implement, serious damage can be done to either the implement or the tractor and in some instances bodily harm to the tractor operator.

It is, therefore, an object of this invention to provide an improved overload release device for implements to permit rapid release of the implement from the tractor in the event an obstruction is encountered by the implement.

Another object of this invention is to provide an improved overload implement release device which provides not only for instantaneous release of the implement from the tractor upon encountering a relatively immovable object but one which can be readily and conveniently reconnected to the implement.

The specific nature of this invention, as well as other objects and advantages thereof, will become apparent to those skilled in the art from the following detailed description, taken in conjunction with the one sheet of drawings on which, by way of preferred example only, is illustrated one embodiment of this invention.

On the drawings:

Figure 1 is a side view of the overload release mechanism shown in the locked position.

Figure 2 is a view similar to Figure 1 but showing the lock member in the released position.

Figure 3 is a plan view of Figure 2.

Figure 4 is an enlarged detail side view of the lower end portion of the latch.

Figure 5 is a view showing the right hand face of Figure 4.

Figure 6 is an enlarged detail rear view of the latch tip portion.

Figure 7 is a side view of Figure 6.

As shown on the drawings:

In Figure 1 there is shown, in assembled relation, an improved quick release hitch constructed in accordance with this invention. The hitch shown in Figure 1 comprises a bracket 10 consisting of a bottom plate 10a and a pair of laterally spaced plate-like uprights 10b and 10c, respectively welded to the forward edge of bottom plate 10a and to the center of such plate. Bracket 10 surrounds a tractor drawbar 11. The uprights 10b and 10c respectively snugly engage the adjacent sides of drawbar 11 with bottom plate 10a contacting the underside of drawbar 11. A bolt 12 secures bottom plate 10a in a selected transverse position on drawbar 11, as is usual there being a plurality of laterally spaced bolt holes 11a in drawbar 11, any one of which may be conveniently aligned with a suitable vertical aperture in bottom plate 10a by simply sliding bracket 10 along drawbar 11 until proper register of the desired holes is effected. Bottom plate 10a is tapered rearwardly, as shown in Figure 3, from the rear edge of the upright plate 10c to define a substantially triangular shaped arm portion 10d. The extreme rear end of the arm portion 10d of plate 10a has a downwardly and rearwardly inclined surface 10e for a purpose to be later explained. The uprights 10b and 10c are respectively provided with aligned, transverse slots 10f and 10g. Slot 10f, however, tapers forwardly, as best shown in Figure 3, for a purpose to be presently described.

A latch carrier 13 is provided to rotatably support a latch 14 to be later described. Latch carrier 13 has a rectangular body portion 13a which slidably fits within the vertical slots 10f and 10g respectively provided in upright plates 10b and 10c. A tapered shoulder 13b is provided on the forward end of the rectangular portion 13a of latch carrier 13 which cooperates with the correspondingly shaped aperture 10f to act as a stop. The portion of latch carrier 13 projecting rearwardly from the upright plate 10c is of enlarged rectangular configuration and defines a head portion 13c. The head portion 13c is bifurcated by a vertical slot 13d in which is inserted the latch 14.

Latch 14 is a two piece member comprising a substantially bar-like lever portion 14a and a tip portion 14b. The lever portion 14a of latch 14 is inserted within the slot 13d defined by the bifurcated head portion 13c of latch carrier 13. Suitable aligned transverse holes are respectively provided in the end of head portion 13c and in the lever portion 14a of lever 14 to permit the insertion of a transverse pin 15 to pivotally mount lever portion 14a to the latch carrier 13. The tip portion 14b is hingedly connected to the lever portion 14a and in its preferred form has a centrally disposed semicircular lug 14c which cooperates in hinged relationship with a corresponding arcuately shaped recess 14d provided in the lever portion 14a. The lower end of lever portion 14a is thus substantially bifurcated by the recess 14d thereby defining a pair of laterally spaced end portions 14e having circularly shaped perimeters, as best shown in Figures 2 and 4. The circular end portions 14e fit within circularly formed cuts 14f respectively provided in tip portion 14b on each side of the circular lug 14c. Lug 14c and the circular ends 14e of lever portion 14a are respectively axially apertured to permit the insertion of a pin 14g to pivotally secure the tip portion 14b to the end of the lever portion 14a. It will be noted that the pin 14g is located a substantial distance rearwardly of pin 15 and at the top of the tip portion 14b for a reason to presently appear.

A cylindrical boss 14h is provided on one side of arcuate lug 14c so that when the tip portion 14b of latch 14 is assembled to the lever portion 14a, a recess 14s will be defined adjacent the right hand end portion 14e of lever 14a, as best shown in Figure 5. A torsion spring 14j surrounds pin 14g and lies within the recess 14s. Spring 14j has its ends respectively bearing against the rear end surfaces of lever member 14a and the tip portion 14b to bias such tip portion in a clockwise direction, as best shown in Figure 4. The tip portion 14b has a shoulder 14k which normally abuts a corresponding shoulder 14m provided on the lever portion 14a to arrest clockwise rotary movement of such tip beyond such point. The tip portion 14b has a rounded lower end 14n blending with an upwardly sloped front surface 14p. It should be noted that when tip portion 14b lies in its normal position with shoulders 14k and 14m abutting, the length of latch 14 exceeds the vertical spacing between bracket plate 10a and latch carrier 13.

The upper end of lever portion 14a is transversely apertured and a rod-like link 25 has its hook shaped rear end 25a pivotally secured within the transverse aperture. Link 25 extends forwardly to within the vicinity of the tractor seat (not shown) where it may be conveniently grasped by the tractor operator to operate the latch 14 as will be presently described.

Latch carrier 13 has a rod-like spring guide 13d integrally joined to the forward shoulder 13b provided on such latch carrier. A spring 16 surrounds spring guide 13d and the rear end of such spring abuts the forward face of the upright plate 10b. The forward end of rod guide 13d is threaded, as shown at 13e, and a pair of nuts 17 are threaded onto such threaded end to adjustably preload spring 16. Thus, spring 16 normally biases latch carrier 13 forwardly or to the left, as shown in Figure 1, so that shoulder 13b is fully engaged in slot 10f and thereby acts as a stop.

In Figures 1, 2 and 3 there is shown the forward portion of an implement frame 18. Such frame has a depending bracket 19 which is secured by a pair of bolts 20 to the leading edge of frame 18 in depending relationship. A ring 21 is suitably secured to the lower end portion of bracket 19, as by a transverse bolt 21a.

The above described hitch is conveniently connected to ring 21 by simply backing up the tractor so that the ring 21 passes between the rearwardly projecting latch carrier 13 and bottom plate 10a. The sloped end surface 10e provided on the rear end of plate 10a facilitates the insertion of ring 21 between the aforementioned two members. In this operation, latch 14 is rotated in a clockwise direction by the operator by a rearward thrust on link 25 to position the latch within the slot 13d of carrier 13 to permit the ring 21 to enter the opening defined by the latch carrier and arm 10a. The tip portion 14b of latch 14 pivots about its hinge pin 14g as latch 14 is moved in a clockwise direction to clear bracket plate 10a since, as mentioned above, the distance between the axis of pin 15 and the rounded end 14n of tip portion 14b is greater than the distance from the axis of pin 15 to the upper surface of bracket plate 10a. The tractor is backed rearwardly until the forward edge of ring 21 contacts the rear face of upright plate 10c whereupon latch 14 is rotated in a counterclockwise direction by the operator pulling the link 25 until such latch assumes the position shown in Figure 1 with the rounded end 14n of tip 14b in contact with plate 10a.

When the tractor is started, the ring 21 will then contact the forward surface of tip 14b. However, latch 14 cannot rotate counterclockwise because of the engagement of rounded end 14n with plate 10a and abutment of stop surfaces 14k and 14m. Furthermore, due to the location of pin 14g rearwardly of pin 15 and the fact that the rearward force imparted to tip 14b by ring 21 is below and forwardly of pin 14g, the upward component of force on tip 14b will thus act to effectively retain tip 14b in the position shown in Figure 1. Hence, the implement will be towed behind the tractor. In the event the implement strikes an obstruction in the ground so that its movement is arrested, or for any other reason the draft is increased beyond a safe point, the ring 21 will then force the carrier 13 to move rearwardly compressing spring 16. Carrier 13 will move rearwardly until the rounded end 14n of latch 14 clears the end of plate 10a whereupon latch 14 will be free to pivot in a counterclockwise direction to release the ring 21 from the hitch 10.

To reattach the implement to hitch 10, it is merely necessary for the operator to rotate latch 14 in a clockwise direction, as previously described, to bring the tip portion 14b up into the slot 13d in the head 13c of latch carrier 13 whereupon the tractor is backed toward the implement so that ring 21 can pass between the opening defined by latch carrier 13 and plate 10a and latch 14 then re-engaged in the same manner as previously described.

In the event it is desired to change implements or to free the implement being towed behind the tractor, all that is necessary to do is to stop the tractor and back it up until ring 21 contacts the rear surface of the upright plate member 10c. Latch 14 is then rotated in a clockwise direction to rotate tip 14b out of ring 21 into slot 13d whereupon the tractor may be moved forward, leaving the implement behind.

From the foregoing description it is clearly apparent that there is here provided a relatively simple yet positive overload release hitch for connecting implements to a tractor which will positively release the implement to avoid damage to either the implement or the tractor if such implement encounters an obstruction. This hitch may also be manually released from the tractor seat to conveniently permit other implements to be attached. It is also readily apparent that the leading of the hitch may be conveniently varied by adjustment of nuts 17 to permit overload release of the hitch at any selected draft force.

It will, of course, be understood that various details of construction may be varied through a wide range without departing from the principles of this invention and it is, therefore, not the wise than necessitated by the scope of the appurpose to limit the patent granted hereon other pended claims.

We claim:

1. An overload release hitch for connecting an implement to a tractor comprising a first member adapted for attachment to the tractor and having a rearwardly extending arm portion, a second member mounted for movement relative to said first member in the line of draft, said second member being spaced from said arm portion to define an opening therebetween, a connecting device adapted for attachment to the implement and receivable in said opening, a latch shiftably mounted on said second member, means manually operable from the tractor seat for shifting said latch into engagement with said arm portion behind said connecting device, thereby connecting the implement to said second member, and resilient means opposing rearward movement of said second member relative to said first member, whereby said latch will be pulled off said arm portion to release said connecting device upon the occurrence of a predetermined draft load.

2. An overload release hitch for connecting a trailed device to a tractor device, comprising a first member adapted for attachment to one of said devices and having a longitudinally extending arm portion, a second member mounted for longitudinal movement relative to said first member in the line of draft, said second member being spaced from said arm portion to define an opening therebetween, a connecting element adapted for attachment to the other of said devices and receivable in said opening, a two piece latch comprising a lever portion and a tip portion hingedly connected to said lever portion, means for pivotally mounting said lever portion on said second member, said lever portion being rotatable to move said tip portion into engagement with said arm portion in draft transmitting relationship to said connecting device, abutment means limiting pivotal movement of said tip portion in the one direction relative to said lever portion which would permit said tip portion to move out of engagement with said arm portion, thereby connecting said connecting element to said second member, and resilient means opposing longitudinal movement of said second member relative to said first member, whereby said latch will be pulled off said arm portion to release said connecting device upon the occurrence of a predetermined draft load.

3. An overload release hitch for connecting an implement to a tractor, comprising a first member adapted for attachment to the tractor and having a rearwardly extending arm portion, a second member mounted for movement relative to said first member in the line of draft, said second member being spaced from said arm portion to define an opening therebetween, a connecting device adapted for attachment to the implement and receivable in said opening, a two piece latch comprising a lever portion and a tip portion hingedly connected to said lever portion, means for pivotally mounting said lever portion on said second member, manually operable means for rotating said lever portion to move said tip portion into engagement with said arm portion behind said connecting device, abutment means limiting pivotal movement of said tip portion in the one direction relative to said lever portion which would permit said tip portion to move out of engagement with said arm portion, thereby connecting the implement to said second member, and resilient means opposing rearward movement of said second member relative to said first member, whereby said latch will be pulled off said arm portion to release said connecting device upon the occurrence of a predetermined draft load.

4. An overload release hitch for connecting an implement to a tractor, comprising a first member adapted for attachment to the tractor and having a rearwardly extending arm portion, a second member mounted for movement relative to said first member in the line of draft, said second member being spaced from said arm portion to define an opening therebetween, a connecting device adapted for attachment to the implement and receivable in said opening, a two piece latch comprising a lever portion and a tip portion hingedly connected to said lever portion, means for pivotally mounting said lever portion on said second member, manually operable means extending to the tractor seat for rotating said lever portion to move said tip portion into engagement with said arm portion behind said connecting device, abutment means limiting pivotal movement of said tip portion in the one direction relative to said lever portion which would permit said tip portion to move out of engagement with said arm portion, thereby connecting the implement to said second member, and resilient means opposing rearward movement of said second member relative to said first member, whereby said latch will be pulled off said arm portion to release said connecting device upon the occurrence of a predetermined draft load.

5. An overload release hitch for connecting an implement to a tractor, comprising a first member adapted for attachment to the tractor and having a rearwardly extending arm portion, a second member mounted for movement relative to said first member in the line of draft, said second member being spaced from said arm portion to define an opening therebetween, a connecting device adapted for attachment to the implement and receivable in said opening, a two piece latch comprising a lever portion and a tip portion hingedly connected to said lever portion, means for pivotally mounting said lever portion on said second member, said lever portion and said tip portion having cooperating stop shoulders limiting relative pivotal movement in one direction, and spring means normally biasing said tip portion in a direction to yieldingly maintain said stop shoulders in abutment, said latch having a greater over-all length than the width of said opening, and manually operable means for pivoting said lever portion to position said tip portion behind said connecting device and in engagement with said arm portion, thereby connecting said second member to the implement and resilient means opposing rearward movement of said second member relative to said first member, whereby said latch will be pulled off said arm portion to release said connecting device upon the occurrence of a predetermined draft load.

6. An overload release hitch for connecting an implement to a tractor, comprising a first member adapted for attachment to the tractor and having a rearwardly extending arm portion, a second member mounted for movement relative to said first member in the line of draft, said second member being spaced from said arm portion to define an opening therebetween, a connecting device adapted for attachment to the implement and receivable in said opening, a two piece latch comprising a lever portion and a tip portion hingedly connected to said lever portion, means for pivotally mounting said lever portion on said second member, said lever portion and said tip portion having cooperating stop shoulders limiting relative pivotal movement in one direction, and spring means normally biasing said tip portion in a direction to yieldingly maintain said stop shoulders in abutment, said latch having a greater over-all length than the width of said opening, manually operable means for pivoting said lever portion to position said tip portion behind said connecting device and in engagement with said arm portion, thereby connecting said second member to the implement, and resilient means opposing rearward movement of said second member relative to said first member, whereby said latch will be pulled off said arm portion to release said connecting device upon the occurrence of a predetermined draft load.

References Cited in the file of this patent

UNITED STATES PATENTS

| Number | Name | Date |
|---|---|---|
| 1,323,634 | Kagay | Dec. 2, 1919 |